(12) United States Patent
Umemura et al.

(10) Patent No.: US 7,356,485 B2
(45) Date of Patent: Apr. 8, 2008

(54) SERVICE PROVIDING SYSTEM

(75) Inventors: Masaya Umemura, Yokosuka (JP); Yukihide Inagaki, Yokohama (JP); Isao Takita, Yokohama (JP); Tsutomu Hara, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 475 days.

(21) Appl. No.: 09/880,824

(22) Filed: Jun. 15, 2001

(65) Prior Publication Data

US 2002/0049651 A1    Apr. 25, 2002

(30) Foreign Application Priority Data

Oct. 20, 2000    (JP)    ............................ 2000-327006

(51) Int. Cl.
*G07B 15/00*    (2006.01)
*G07B 15/02*    (2006.01)
*A47G 29/12*    (2006.01)
*G06K 5/00*    (2006.01)

(52) U.S. Cl. ............................ 705/13; 232/18; 235/382

(58) Field of Classification Search .................... 705/1, 705/13, 17, 18, 14, 41, 44, 26, 27, 65, 67; 235/380–384, 375, 449, 492, 487, 493, 462.46, 235/472.02; 340/5.1, 5.2, 5.6, 5.61; 232/18, 232/7

See application file for complete search history.

(56) References Cited

U.S. PATENT DOCUMENTS

| | | | | |
|---|---|---|---|---|
| 5,025,139 A | * | 6/1991 | Halliburton, Jr. | 235/379 |
| 5,131,038 A | * | 7/1992 | Puhl et al. | 340/5.61 |
| 5,397,883 A | * | 3/1995 | Miyashita | 235/382 |
| 5,414,249 A | * | 5/1995 | Matsumoto | 235/384 |
| 5,471,203 A | * | 11/1995 | Sasaki et al. | 340/5.3 |
| 5,485,520 A | * | 1/1996 | Chaum et al. | 705/74 |
| 5,661,286 A | * | 8/1997 | Fujioka | 235/382 |
| 5,801,372 A | * | 9/1998 | Yamaguchi | 235/492 |
| 5,814,796 A | * | 9/1998 | Benson et al. | 235/375 |
| 5,831,547 A | * | 11/1998 | Ohtsuki et al. | 340/10.41 |
| 5,837,982 A | * | 11/1998 | Fujioka | 340/10.2 |
| 5,872,525 A | * | 2/1999 | Fukasawa et al. | 340/928 |
| 5,877,484 A | * | 3/1999 | Hirose | 235/382 |
| 5,969,332 A | * | 10/1999 | Ueda et al. | 235/492 |
| 6,085,976 A | * | 7/2000 | Sehr | 235/384 |
| 6,094,640 A | | 7/2000 | Goheen | |
| 6,112,989 A | * | 9/2000 | Sheldon | 235/384 |
| 6,173,897 B1 | * | 1/2001 | Halpern | 235/488 |
| 6,464,145 B1 | * | 10/2002 | Chimura | 235/492 |

(Continued)

FOREIGN PATENT DOCUMENTS

EP    789331 A1 *    8/1995

(Continued)

*Primary Examiner*—Igor N. Borissov
(74) *Attorney, Agent, or Firm*—Mattingly, Stanger, Malur & Brundidge, P.C.

(57) ABSTRACT

A system for providing a service through a non-contact communication unit such as a wireless communication unit is disclosed. Specifically, an electronic ticket is communicated between a so-called mobile terminal and the non-contact communication unit equipped in a ticket examiner. The ticket examiner comprises a stocker for storing magnetized slips, roll paper or plastic slips, and a shaper for cutting the magnetized slip or the roll paper into a proper size. The ticket examiner confirms the validity of the electronic ticket for issuing a ticket.

16 Claims, 8 Drawing Sheets

U.S. PATENT DOCUMENTS

| | | | |
|---|---|---|---|
| 6,513,015 B2 * | 1/2003 | Ogasawara | 705/26 |
| 6,712,267 B2 * | 3/2004 | Imazuka | 235/381 |
| 6,717,522 B1 * | 4/2004 | Nagatomo et al. | 340/815.4 |
| 6,966,491 B2 * | 11/2005 | Gyger | 235/382 |

FOREIGN PATENT DOCUMENTS

| | | |
|---|---|---|
| JP | 887655 | 4/1996 |
| JP | 10162176 | 6/1998 |
| JP | 3064207 | 9/1999 |
| JP | 200020767 | 1/2000 |
| WO | 0028484 | 5/2000 |

* cited by examiner

SERVICE PROVIDING SYSTEM

BACKGROUND OF THE INVENTION

1. Field of the Invention

The present invention relates to a system which can provide electronic settlements and services through wireless communications.

Generally, for providing a service based on a paid price, a service provider needs to confirm whether or not a price has been paid for the service, i.e., whether or not the payment has been settled. For example, a service provider may confirm a ticket which certifies that a price has been paid by means of a ticket examiner for managing the admission to a site where a certain service is provided. An automatic vending machine, in turn, confirms a price with money introduced thereinto.

In the following, a conventional ticket examiner will be described.

A conventional ticket examiner 100 illustrated in FIG. 9 comprises a magnetic head 2; a printer 3; a slot and paper handler 41; a paper handler and pickup port 42; a collector box 5; a controller 6; an optical sensor based light receiver 7; a light source 71; and motor driven gates 81, 82. The ticket examiner 100 is used not only at entrances to means of communication but also at entrances/exits of concert sites, event sites, amusement parks and so on.

For admission, the conventional ticket examiner 100 reads account information and so on recorded on a ticket introduced from the slot 41 with the magnetic head 2. Upon determination of a valid ticket based on the read account information and so on, the ticket examiner 100 magnetically writes data on the ticket, comparable to the punching. Subsequently, the printer 3 prints the admission time and so on on the ticket and mechanically punches out the ticket, and then sends the resulting ticket to the pickup port 42.

In the meantime, the spectator passes through the motor driven gate 81, now opened, to interrupt the optical sensor 7 in this event. The ticket examiner 100 closes the motor driven gate 82 at this time, but does not close the gate 82 if the introduced ticket is valid. If the ticket is not valid, the ticket examiner 100 continuously generates an alarm with the gate closed to notify the spectator and surroundings that the ticket is not valid.

For exit, account information and so on are read from a ticket introduced from the slot 41 with the magnetic head 2. When the ticket is determined as valid based on the account information, the ticket is collected in the collector box 5 from the paper handler 42. Conversely, if the ticket is determined as invalid, the ticket is sent to the pickup port 42.

In the meantime, the spectator passes through the motor driven gate 81 to interrupt the optical sensor 7. The ticket examiner 100 closes the motor driven gate 82 at this time, but does not close the gate if the ticket is determined as valid. If the ticket is not valid, the ticket examiner 100 continuously generates an alarm, with the gate closed, to notify the spectator and surroundings that the ticket is not valid.

The conventional ticket examiner requires a spectator, when he passes therethrough for admission, to introduce as a ticket a slip applied with a magnetic tape adhered on the back surface thereof or a slip dedicated to the ticket examiner. Thus, even when a spectator uses a so-called electronic ticket which has been electronically stored in a mobile terminal such as a mobile telephone or the like, among other tickets purchased through electronic settlements via the Internet or the mobile telephone, the spectator must go through the issuance of a ticket of paper from the electronic ticket before admission, and then introduce the issued ticket into the ticket examiner for admission.

The requirement to such a sequence is not limited only to the ticket examiner but is common to other systems for use in providing other services. In other words, even if a person who is going to receive a service has information which guarantees an electronic price such as electronic money or an electronic ticket or the like, he must once convert the information to a physical entity, for example, a ticket, coin, bill or the like when he is going to receive a service through a system which is not capable of directly receiving the electronic money and so on, such as a vending machine and a ticket examiner.

As such, since the conversion is time consuming, the person who is going to receive the service must wait for a long time required for the conversion.

SUMMARY OF THE INVENTION

It is therefore an object of the present invention to simply and reliably provide a service to a user, who should receive the service using an electronic ticket or the like stored in a mobile terminal or the like.

To achieve the above object, the present invention provides a system for providing a service which includes a mobile terminal that stores electronic tickets or the like, and an apparatus for receiving a compensation such as an electronic ticket or information for guaranteeing the compensation. For example, a wireless non-contact communication means is provided in each of the mobile terminal and the apparatus, such that the electronic ticket or the like is transferred therebetween for confirmation through the communication means to provide an actual service.

Also, in the present invention, the electronic ticket is transferred between a mobile terminal and a ticket examiner through a non-contact communication means such as wireless communication means provided in each of the mobile terminal and the ticket examiner. The ticket examiner comprises means for storing magnetized slips, magnetized roll paper, plastic strips or slips, and shaping means for cutting the magnetized slip or the like into a proper size. The ticket examiner may be configured to confirm the validity of the electronic ticket before issuing a ticket.

The apparatus for confirming the compensation may be an automatic vending machine or an automatic ticket vending machine.

DETAILED DESCRIPTION OF THE EMBODIMENTS

Figure 1:
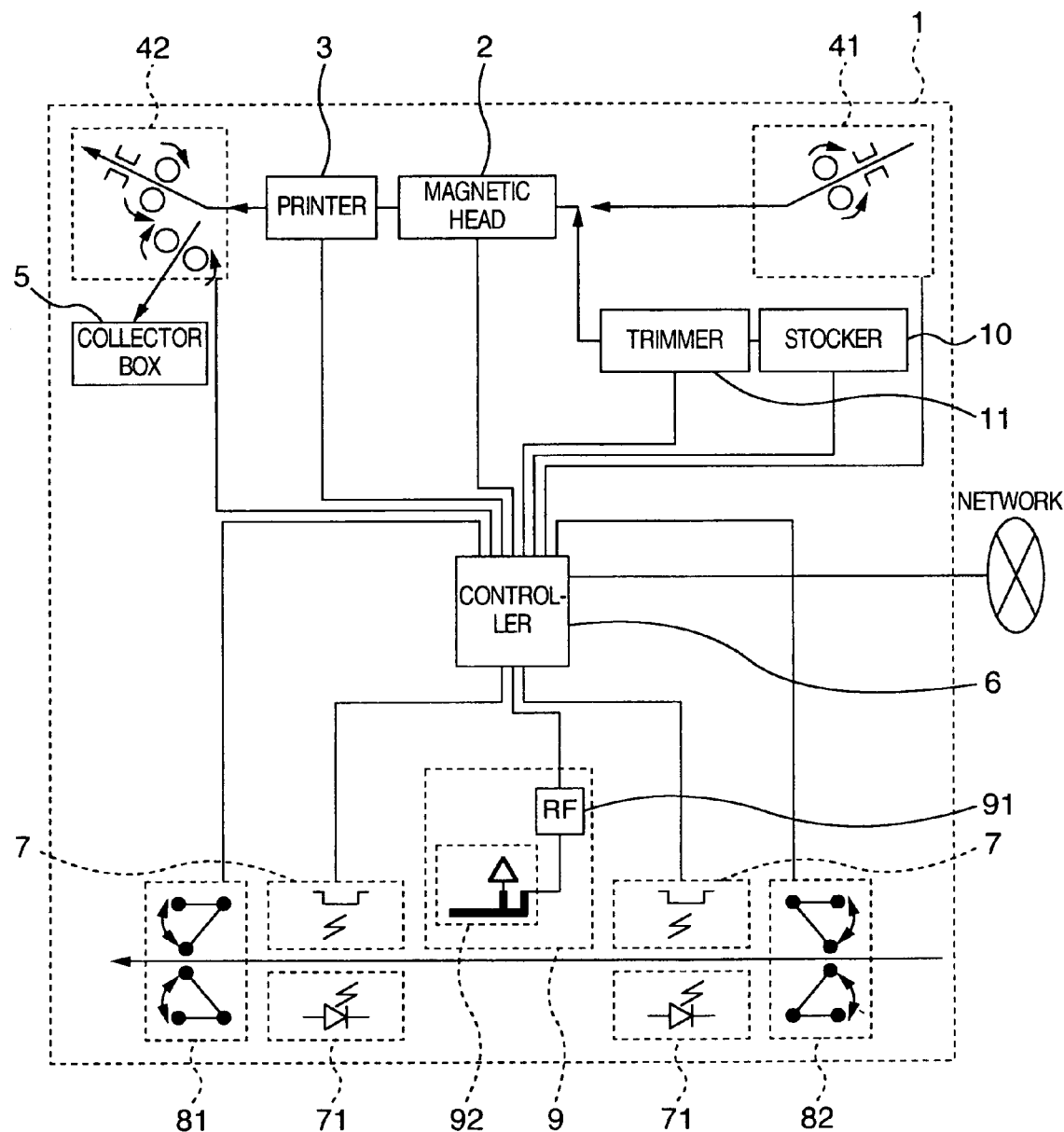
FIG. 1 is a block diagram illustrating a ticket examiner according to a first embodiment of the present invention.
Figure 6:
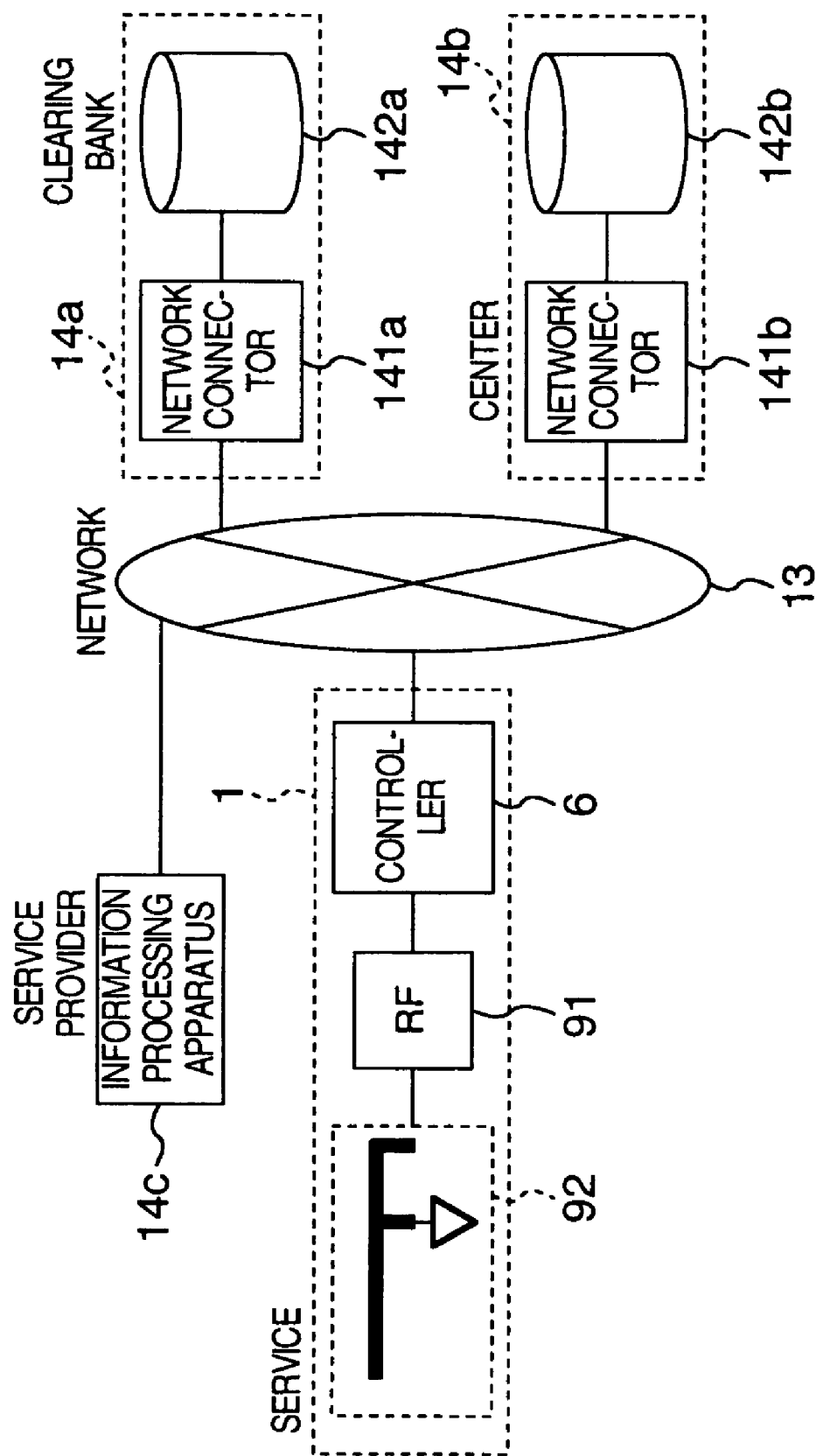
FIG. 6 is a block diagram illustrating a network topology in the first embodiment.

A first embodiment of the present invention is illustrated in FIGS. 1 and 6. In FIG. 1, a ticket examiner 1 comprises a magnetic head 2; a printer 3; a slot and a paper handler 41; a paper handler and a pickup port 42; a collector box 5; a controller 6; an optical sensor based light receiver 7; a light source 71; and motor driven gates 81, 82. A non-contact communication unit 9 comprises a baseband control circuit and RF 91; an antenna 92; a stocker 10; and a trimmer 11.

The motor driven gates 81, 82 may be installed remotely from the ticket examiner 1, in which case the motor driven gates 81, 82 may be connected to the ticket examiner 1 through a network or the like. It is also contemplated that a plurality of ticket examiners 1 are installed in parallel to define passages for spectators. In the later case, the motor driven gates 81, 82 are shared by two ticket examiners 1. For opening and closing the motor driven gates 81, 82 when they are shared, one of the ticket examiners 1 may transmit a signal for opening and closing the gates to the other ticket examiner 1.

The ticket examiner 1 serves to permit a service provider to provide a service by managing entry and exit to and from a site in which a service is provided.

In the following, a method of permitting the provision of a service will be described in a specific manner.

As a spectator, who carries a mobile terminal having an electronic ticket stored therein, approaches the ticket examiner 1, a communication link is established between a non-contact communication unit of the mobile terminal and the non-contact communication unit 9 of the ticket examiner 1. Any conventional wireless communication techniques may be employed for establishing the link. Alternatively, the link may be established by the respective communication apparatuses which make communications where each of the communication apparatuses act as a master of the communications to the other party.

As the link is established, the ticket examiner 1 sends audio data for forcing the mobile terminal to make an aural guidance, or a command for specifying audio data stored in the mobile terminal and instructing the mobile terminal to output the specified audio data. Upon receipt of the command transferred thereto, the mobile terminal outputs a voice based on the sent audio data or the audio data specified by the command. The user who carries the mobile terminal is prompted to gradually approach and pass through the ticket examiner 1 for admission, guided by the voice outputted from the mobile terminal. In this way, the aural guidance is implemented. The voice outputted from the mobile terminal may be mechanically synthesized one or a recorded natural voice of the user or a third person. Alternatively, the aural guidance may be replaced with a text or image based guidance, or the guidance function itself may even be omitted.

After the link has been established, the ticket examiner 1 acquires information on an electronic ticket from the mobile terminal. The ticket examiner 1 refers to a center through the network for the acquired information on the electronic ticket. Upon confirmation of a valid ticket as a result of the reference, the controller 6 of the ticket examiner 1 generates printing data and data to be magnetically recorded as preparation for issuing a ticket, and stores the data in the controller 6. The preparation for issuing the ticket is made independently of the admission control at any time for each mobile terminal which has established a link with the ticket examiner 1.

As the spectator enters the ticket examiner 1 in accordance with the aural guidance, the optical sensor 7 senses the spectator passing through the ticket examiner 1. The ticket examiner 1, which has sensed the spectator passing therethrough, proceeds to a process for identifying the spectator and the mobile terminal.

The ticket examiner 1 attempts to call a mobile terminal near the ticket examiner 1 using the non-contact communication means 9. If a ticket is introduced through the slot 41 while a call is being made, the ticket examiner 1 stops calling. As the spectator goes forward on, the ticket examiner 1 continues to call on the assumption that the spectator will not introduce a ticket.

At the time the ticket examiner 1 receives a response to the call from the mobile terminal, the ticket examiner 1 sends the previously prepared printing data and data to be magnetically recorded to the printer 3 and the magnetic head 2, respectively. The stocker 10 stores slips for displaying the certificate of granted admission, for example, slips coated with a magnetic material. A given number of such slips coated with a magnetic material are delivered from the stocker 10, shaped by the trimmer 11, and then sent to the magnetic head 2. The magnetic head 2 writes magnetic data onto the slips sent thereto. The printer 3 prints characters on the front and back sides of each slip, onto which the magnetic data has been written, based on the printing data, and punches out the slips. The paper handler 42 delivers the slips processed by the printer 3 to the pickup port.

After the printer 3 has printed data, the controller 6 of the ticket examiner 1 opens the motor driven gate 82 and permits the spectator to pass therethrough.

In this embodiment, electronic tickets are stored in a mobile terminal which actively operates. Alternatively, the ticket examiner 1 of this embodiment may be used as well when electronic tickets are stored on a medium, as represented by a non-contact IC card, which passively operates.

As the ticket examiner 1 senses that a spectator carrying a non-contact IC card has entered the gate of the ticket examiner 1, electric waves are irradiated from the non-contact communication means 9. The spectator carrying the non-contact IC card faces the non-contact IC card to the non-contact communication means 9. In this event, the power of the electric waves irradiated from the non-contact communication means 9 activates the non-contact IC card. The activated non-contact IC card transmits information on an electronic ticket stored therein, multiplexed on the electric waves, to the ticket examiner 1. Then, the non-contact communication means 9 receives the multiplexed electric waves.

Subsequently, a process for issuing a ticket is performed through verification and so on, as is the case with the mobile terminal.

Figure 2:
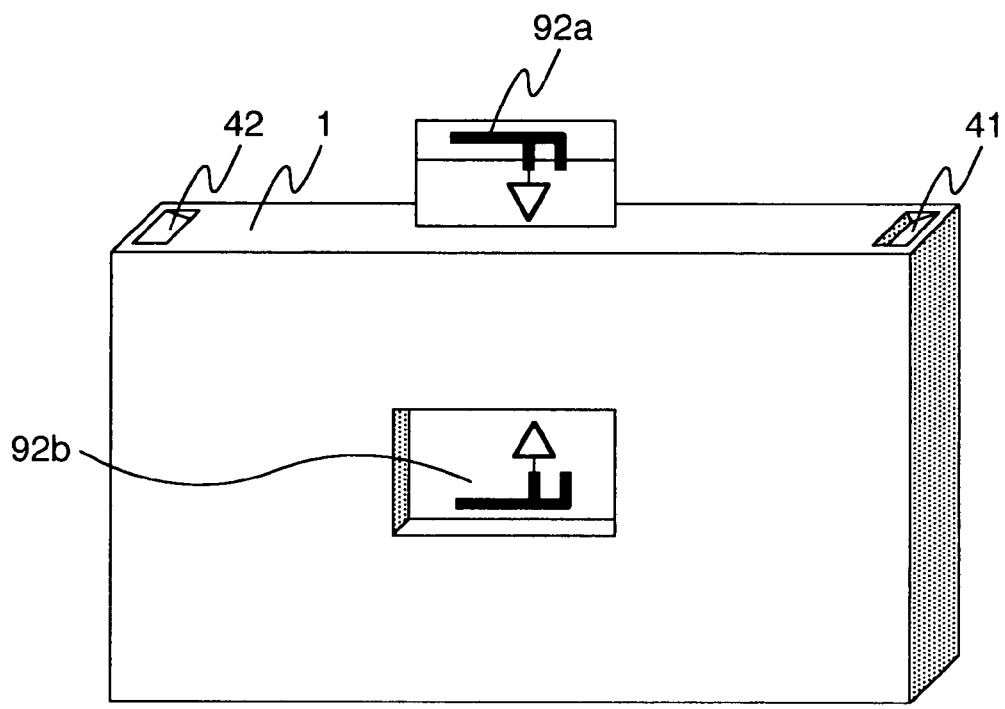
FIG. 2 illustrates an outer appearance of the ticket examiner in the first embodiment.

FIG. 2 illustrates an outer appearance of the ticket examiner 1 according to this embodiment. As can be seen, the motor driven gates 81, 82 are not illustrated. The antenna 92 of the non-contact communication unit 9 is comprised of two antennas 92*a*, 92*b*. The antenna 92*a* is mounted at a position at which communications between the ticket examiner 1 and a mobile terminal are blocked as less frequently as possible, for example, at a location on the top surface or on the front surface of the ticket examiner 1. The antenna

92b is mounted on a side surface which faces a passage through which spectators pass through the ticket examiner 1. The ticket examiner 1 establishes a link with a mobile terminal of a spectator through the antenna 92a. The ticket examiner 1 identifies a spectator using the antenna 92b.

Figure 3:
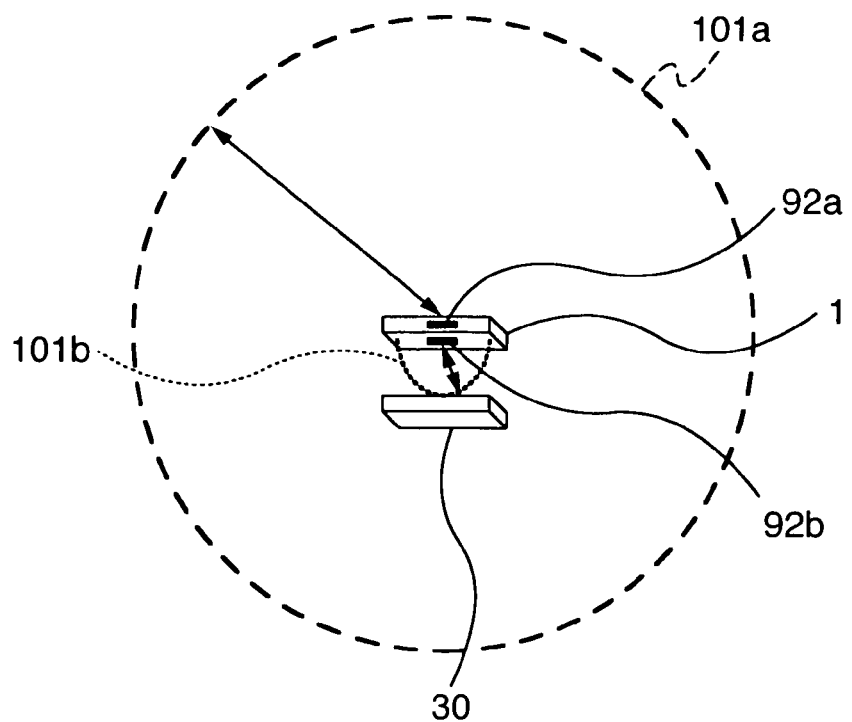
FIG. 3 shows wave accessible/audible ranges in the first embodiment.

FIG. 3 shows a wave accessible/audible range of the non-contact communication unit 9 in this embodiment. In the figure, the ticket examiner 1 defines a passage for spectators to pass together with a component 30. In this event, the component 30 may be a plate fixed in parallel with the ticket examiner 1, or another ticket examiner which has similar functions to the ticket examiner 1. In this embodiment, the component 30 is assumed to have no functions of the ticket examiner.

In this embodiment, a wave accessible range, corresponding to input/output sensitivities of the baseband control circuit and RF 91 of the non-contact communication unit 9, is substantially equal to an audible range. In FIG. 3, wave accessible/audible ranges associated with the antennae 92a, 92b are designated by 101a, 101b, respectively. The wave accessible/audible range 101a extends over a radius of 10 meters centered at the ticket examiner 1, while the wave accessible/audible range 101b extends over a radius of one meter centered at the ticket examiner 1.

Figure 4:
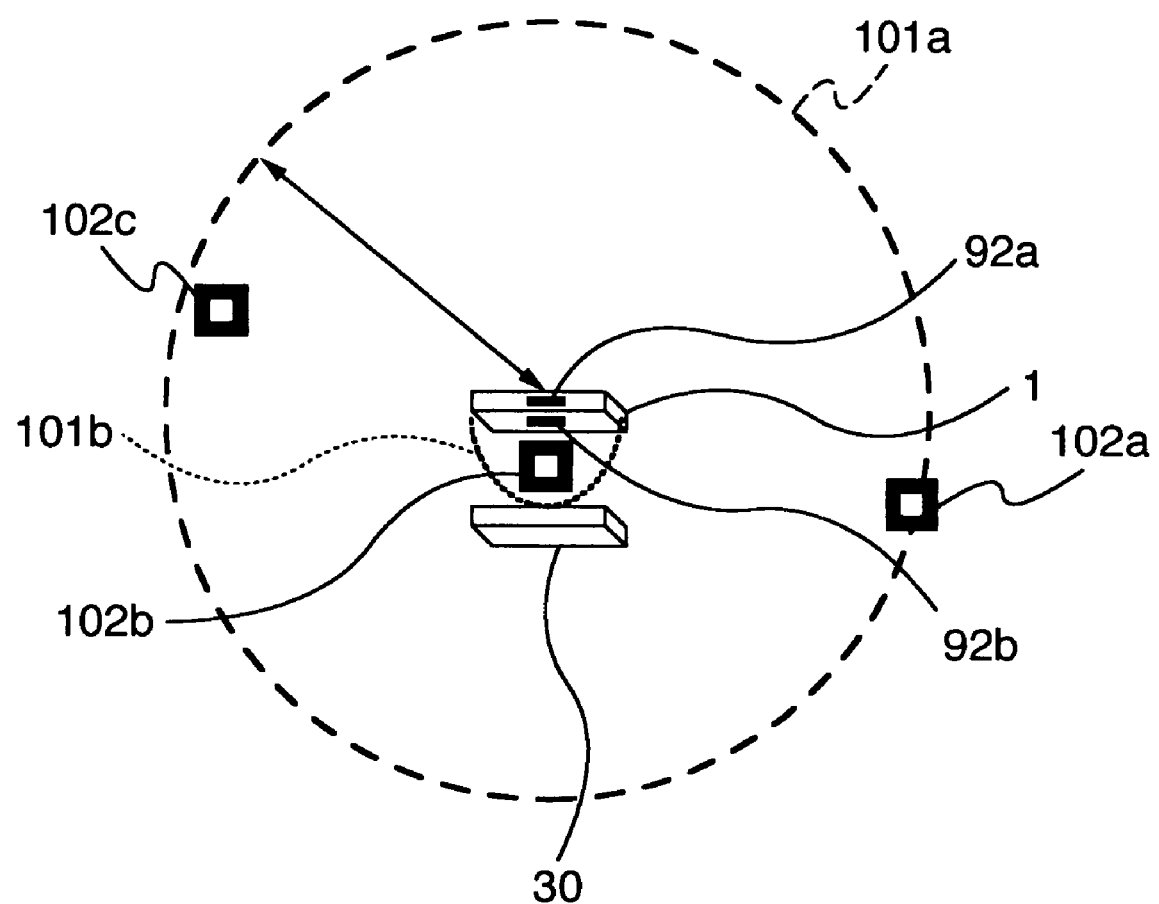
FIG. 4 shows a relationship between the wave accessible/audible range and a mobile terminal in the first embodiment.

FIG. 4 shows a relationship between the wave accessible/audible range of the non-contact communication unit 9 and a mobile terminal in this embodiment. In FIG. 4, 102a, 102b, 102c indicate the positions of mobile terminals carried by spectators. Therefore, the positions 102a, 102b, 102c are essentially equivalent to the positions of the spectators. The position 102a indicates a position when the spectator goes forward into the wave accessible/audible range 101a of the ticket examiner 1. Subsequently, as long as the mobile terminal of the spectator lies within the wave accessible/audible range 101a, the ticket examiner 1 maintains a link established with the mobile terminal of the spectator.

In the following, description will be made on a positional relationship between the wave accessible/audible range and a spectator.

A spectator, who has entered the wave accessible/audible range 101a of the ticket examiner 1 at the position 102a, is prompted by the aural guidance to approach the ticket examiner 1. The ticket examiner 1 starts calling in the wave accessible/audible range 101b in preparation for the passage of the spectator. As the spectator reaches the position 102b, a mobile terminal carried by the spectator responds to the call from the ticket examiner 1. With this response, the ticket examiner 1 identifies the spectator and issues a ticket. The spectator, who has received the issued ticket, passes through the passage defined by the ticket examiner 1 and the plate 30, and goes out of the wave accessible/audible range 101a of the ticket examiner 1 at the position 102c. The ticket examiner 1 instructs the mobile terminal to discard or invalidate the electronic ticket stored in the mobile terminal, while the spectator moves from the position 102b to 102c.

Figure 5:
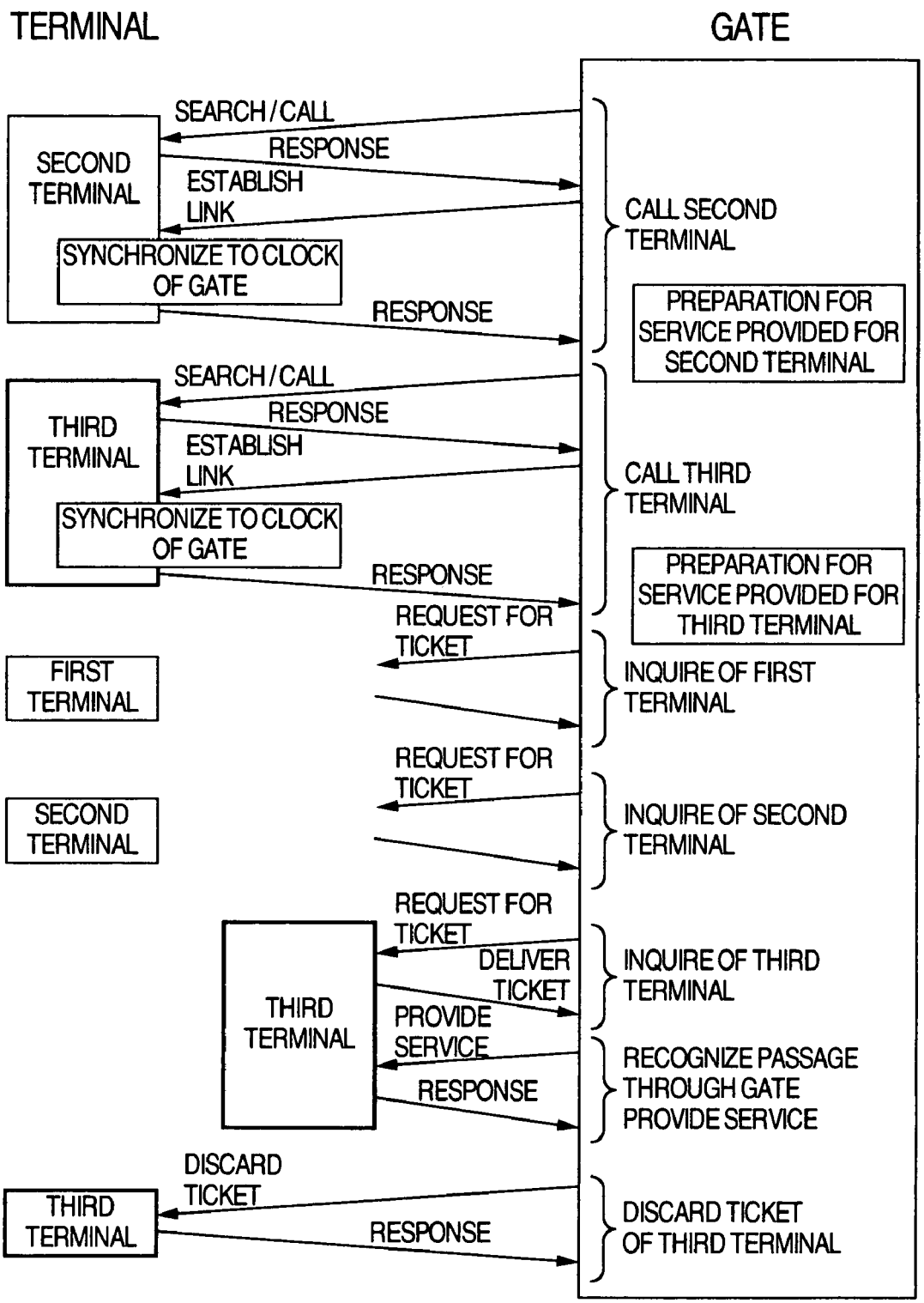
FIG. 5 is a flow diagram illustrating an admission process which involves a plurality of mobile terminals in the first embodiment.

FIG. 5 illustrates operations involved in the admission of a plurality of spectators in this embodiment. While FIG. 5 shows three mobile terminals, the number of mobile terminals, i.e., the number of spectators, which can be processed at one time by the ticket examiner 1 depends on inherent identifiers such as addresses, and a particular protocol. Therefore, a larger number of spectators can be collectively processed if required.

FIG. 5 illustrates processes in communications between the mobile terminals and the ticket examiner 1 and processes in the respective apparatus in a time series format. Assume that a link has been previously established between a first mobile terminal and the ticket examiner 1.

As a second mobile terminal enters the wave accessible/audible range of the ticket examiner 1, the ticket examiner 1 searches for the second mobile terminal and calls the second mobile terminal. A link is established therebetween when the second mobile terminal responds to the call. In this event, an identifier and synchronization clock information given to the second mobile terminal upon establishment of the link is transferred from the ticket examiner 1 to the second mobile terminal. In response, the second mobile terminal synchronizes its clock to that of the ticket examiner 1, and responds to the ticket examiner 1 to that effect. The response from the mobile terminal includes information on an electronic ticket and so on. Through a sequence of communications, the ticket examiner 1 successfully calls the second mobile terminal. In response, the ticket examiner 1 prepares for permitting the provision of a service for the second mobile terminal.

In preparation for permitting the provision of a service, the ticket examiner 1 refers to the center through the network for the acquired information on the electronic ticket. Upon confirmation of a valid ticket as a result of the reference, the ticket examiner 1 generates printing data and data to be magnetically recorded as preparation for issuing a ticket.

In a similar procedure, the ticket examiner 1 calls a third mobile terminal, and prepares for permitting the provision of a service.

When calls from mobile terminals are temporarily depleted, or when a previously determined time period has elapsed through a timer interruption or the like, the ticket examiner 1 confirms, using the antenna 92b, whether or not any mobile terminal is close to the ticket examiner 1, e.g., within a radius of one meter from the antenna 92b in this embodiment (hereinafter referred to as "sense"). If a spectator passes across the optical sensor 8, the spectator is unconditionally sensed.

The ticket examiner 1 first requests the first mobile terminal for a ticket through the antenna 92b. Supposing that the first mobile terminal does not exist near the ticket examiner 1, the first mobile terminal does not receive the request for a ticket, and consequently cannot respond thereto. Since no response is returned from the first mobile terminal, the ticket examiner 1 confirms that the first mobile terminal does not exist nearby.

In continuation, the ticket examiner 1 requests the second mobile terminal for a ticket. Suppose that the second mobile terminal does not either exist near the ticket examiner 1. Thus, the ticket examiner 1 receives no response from the second mobile terminal, thereby recognizing that the second mobile terminal does not exist nearby.

Subsequently, the ticket examiner 1 requests the third mobile terminal for a ticket. Supposing that the third mobile terminal exists near the ticket examiner 1, the ticket examiner 1 receives a response from the third mobile terminal. In this way, the ticket examiner 1 recognizes that the third mobile terminal exists nearby.

The ticket examiner 1, when recognizing that the third mobile terminal exists nearby, determines that the third mobile terminal is a terminal carried by a spectator who has passed across the optical sensor 8 at any time before or after the recognition, and performs the operation involved in issuing a ticket.

Upon completion of the issuance of a ticket, the ticket examiner 1 requests the third mobile terminal to discard an associated electronic ticket stored therein. In response, the third mobile terminal discards or invalidates the electronic ticket, and notifies the ticket examiner 1 to that effect. The ticket examiner 1 completes a sequence of the ticket examination processing by receiving a response from the third mobile terminal. Upon completion of the ticket examination processing, the ticket examiner 1 disconnects the link with the third mobile terminal. Subsequently, the ticket examiner 1 starts calling another mobile terminal through the antenna 92b.

FIG. 6 illustrates the network topology in this embodiment. The network topology comprises a network 13; an information processing apparatus 14a in a bank which makes settlements; an information processing apparatus 14b in a credit company or the like; an information processing apparatus 14c in a service provider; a computer and network connector 141 of the information processing apparatus; and a storage 142.

The ticket examiner 1 in the figure refers to the information processing apparatus 14c in the service provider for an electronic ticket by sending data transmitted thereto from a mobile terminal. The information processing apparatus 14c in the service provider determines based on the transmitted data whether or not the electronic ticket is valid. When the ticket examiner 1 terminates the provision of a service or issues a ticket for permitting the provision of a service, the ticket examiner 1 notifies the information processing apparatus 14c in the service provider, through the network 13, that the electronic ticket has been used. The information processing apparatus 14c in the service provider, upon receipt of the notification, adds data to a record corresponding to the ticket in the storage 142, indicating that the ticket has been used.

Depending on general contractual conditions at the time the electronic ticket was reserved, a price may be paid by a variety of media such as advance payment, debit, installment, credit and so on. The network of this embodiment can support any of these media. For advance payment or electronic debit, a settlement is made in a clearing bank at the time the electronic ticket is sold. For installment or credit, an associated credit company or the like is notified of the amount due at the time data indicative of used ticket is added to a record associated with the ticket in the storage 142, so that a settlement is made between a service provider and the credit company.

Figure 7:
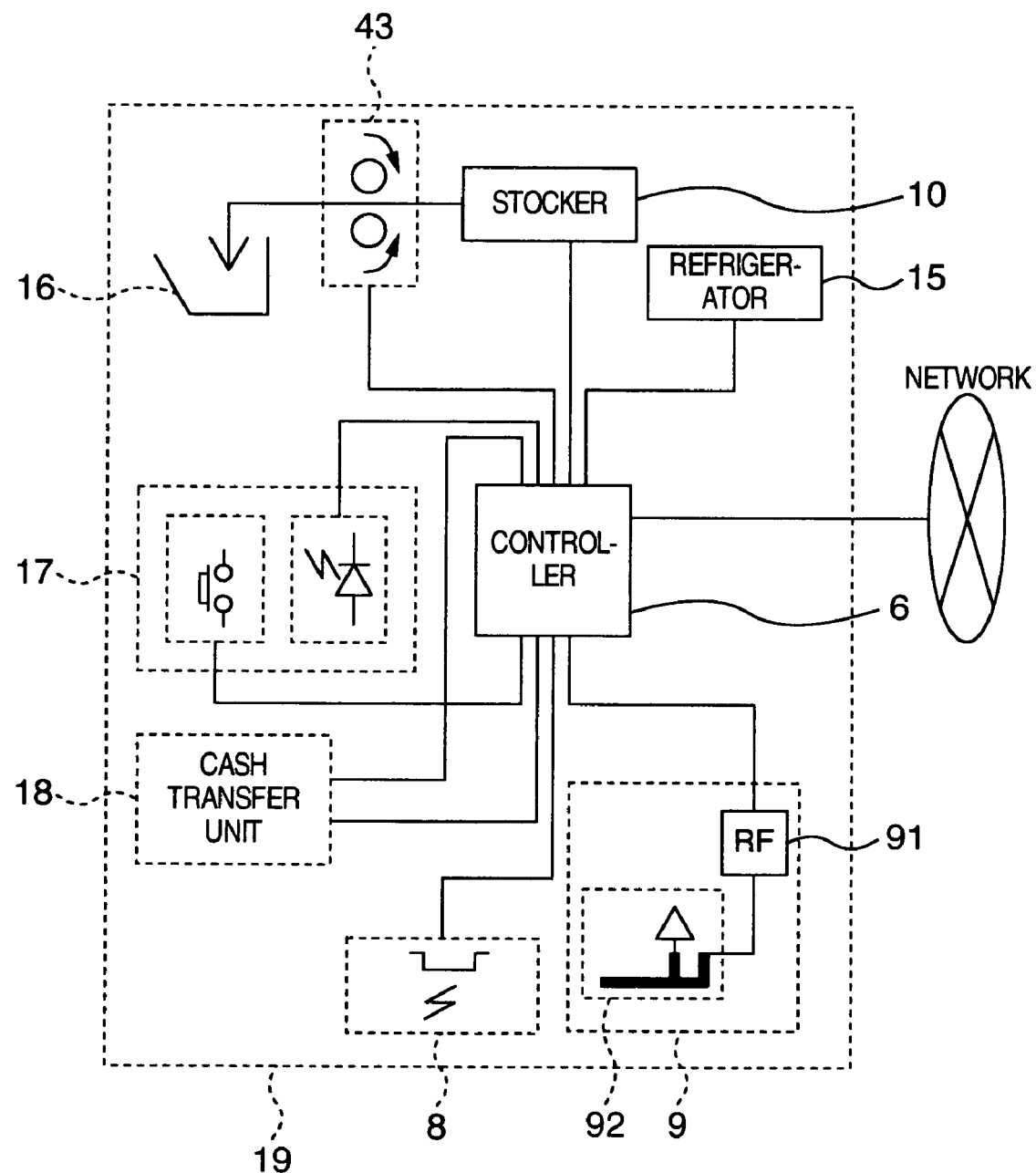
FIG. 7 is a block diagram illustrating an automatic vending machine according to a second embodiment of the present invention.

FIG. 7 illustrates a second embodiment of the present invention. An automatic vending machine 19 illustrated in FIG. 7 comprises a refrigerator and heater 15; a catch pan 16 of a take-out port; a liquid crystal display 17 equipped with a touch panel which functions as a display and a selector; and a cash transfer unit 18 for confirming and counting bills and coins and delivering changes.

When the automatic vending machine 19 is installed for selling canned juice, for example, the stocker 10 stores articles, i.e., canned juice, and the refrigerator and heater 15 cool or heat the stocker 10 to keep the stored canned juice at an appropriate temperature.

A method of providing a service in the second embodiment will be described below.

As a purchaser, carrying a mobile terminal, approaches the automatic vending machine 19, the automatic vending machine 19 senses that a person is approaching by means of an optical sensor, heat sensor based on infrared sensing 8. Subsequently, the automatic vending machine 19 calls the mobile terminal using a non-contact communication means 9 to establish a link with the mobile terminal of the purchaser. In the second embodiment, the number of links established at one time in the automatic vending machine 19 is limited to one. The mobile terminal, following a request for a ticket from the automatic vending machine 19, responds with compensation information which guarantees a price to be paid for a provided service, such as electronic money, credit card number, electronic ticket, customer number or the like.

The customer number is a number given to a purchaser who has been previously registered by the service provider. When the purchaser utilizes a service through the customer number, a settlement is made based on general contractual conditions arranged between the service provider and the purchaser.

The automatic vending machine 19 refers to the center for the compensation information by transmitting the acquired compensation information to the center. The center determines the validity of the compensation information, and returns the result to the automatic vending machine 19. The automatic vending machine 19 confirms based on the returned result that the compensation information is valid and that there is a remainder more than a price for a provided service, and proceeds to a process for providing a service.

The automatic vending machine 19, which has proceeded to the service providing process, arranges and displays available articles on the display and selector 17, and waits for the purchaser to select an article. As the purchaser touches a particular position on the display and selector 17, the automatic vending machine 19 knows which article has been selected, causing an extractor 43 to transport the selected article from the stocker 10 to the catch pan 16 of the take-out port.

At this time, the automatic vending machine 19 notifies the center that the sale of the article is completed, requests for a settlement, and informs details on articles stored in the stocker 10.

Also, when the electronic money or the like is utilized, the amount larger than a price for a provided service may be electronically paid. The purchaser pays a surplus amount of money by specifying a price to be paid in addition to the electronic money when he is inquired by the automatic vending machine 19.

When a surplus amount of money is paid, the automatic vending machine 19 refunds the surplus money when the purchaser pushes down a refund lever after receiving an article. The refund can also be carried out electronically through communications, provided that a link remains established between the automatic vending machine 19 and the mobile terminal. Alternatively, the refund may be made upon a request for disconnecting the link from the mobile terminal, or inadvertent disconnection of the link.

As the link between the automatic vending machine 19 and the mobile terminal is disconnected, the automatic vending machine 19 turns off illumination for the display and selector 17 or prevents any article from being delivered, and pays out cash from the cash transfer unit 18. The cash transfer unit 18 notifies the center of the numbers of bills and coins stored therein each time it transfers cash.

Figure 8:
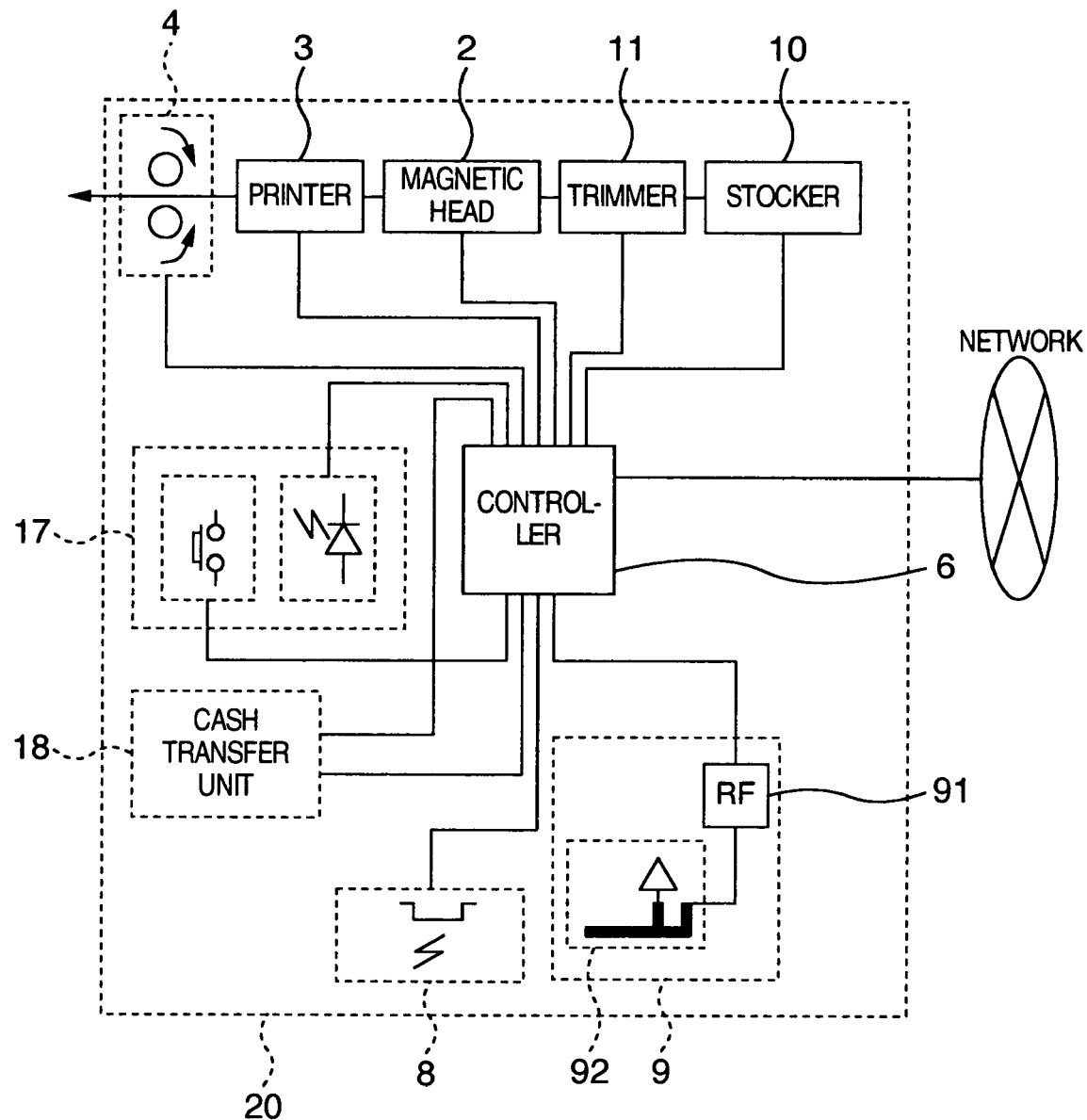
FIG. 8 is a block diagram illustrating a ticket vending machine according to a third embodiment of the present invention.
Figure 9:
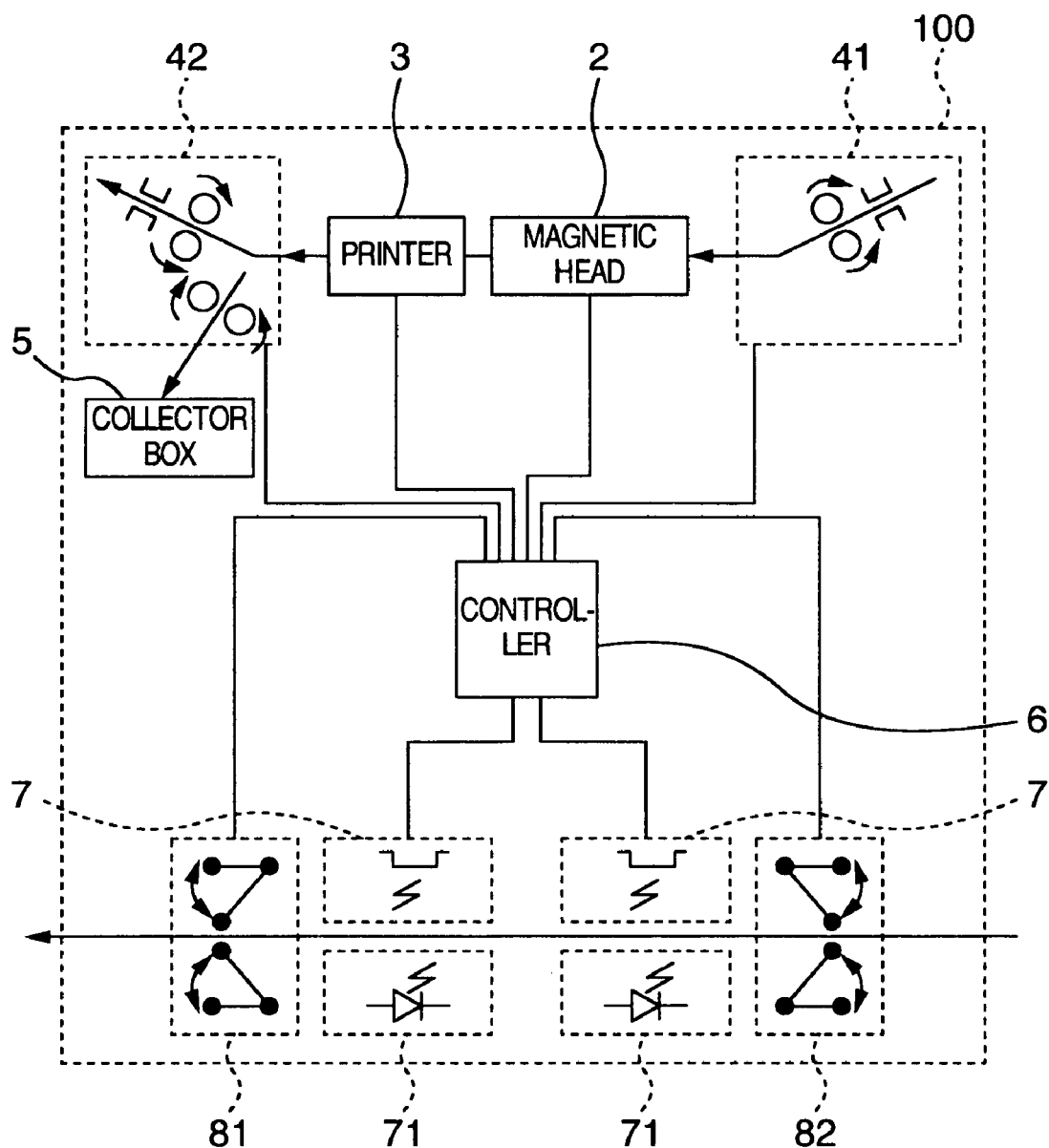
FIG. 9 is a block diagram illustrating a conventional ticket examiner.

FIG. 8 illustrates a third embodiment of the present invention. Specifically, FIG. 8 illustrates an automatic ticket vending machine 20 according to the present invention.

The automatic ticket vending machine 20 may be such one that may be found, for example, in a station, beside a check-in counter in an airport, or in an amusement park for selling tickets for an attraction.

As a purchaser, carrying a mobile terminal, approaches the automatic ticket vending machine 20, the automatic ticket vending machine 20 senses that a person is approaching by means of an optical sensor 8. In continuation, the automatic ticket vending machine 20 calls the mobile terminal using a non-contact communication unit 9 to establish a communication link with the mobile terminal of the purchaser. In the third embodiment, the number of links established at one time in the automatic ticket vending machine 20 is limited to one. The mobile terminal, following a request for a ticket from the automatic ticket vending machine 20, transfers guarantee information to the automatic vending machine 20 for guaranteeing a price to be paid for a provided service, such as electronic money, credit card number, electronic ticket, customer number or the like.

The automatic ticket vending machine 20 refers to the center for the compensation information by transmitting the acquired guarantee information to the center. The center determines the validity of the guarantee information, and returns the result to the automatic ticket vending machine 20. The automatic ticket vending machine 20 confirms based on the returned result that the guarantee information is valid and that there is a remainder more than a price for a provided service, and provides a service to the purchaser.

The automatic ticket vending machine 20, for providing a service, arranges and displays articles on the display and selector 17 and waits for the purchaser to select an article. When the purchaser has previously reserved a seat through an electronic ticket, the automatic ticket vending machine 20 displays a reservation number and the contents of the reservation. When the purchaser touches a particular position on the display and selector 17, the automatic ticket vending machine 20 responsively knows a selected article, and issues a ticket corresponding to the selected article.

At this time, the automatic ticket vending machine 20 notifies the center that the sale of the article is completed, requests for a settlement, and informs details on articles stored in the stocker 10.

Also, when the electronic money or the like is utilized, the amount larger than a price for a provided service may be electronically paid. Therefore, the purchaser may electronically pay a surplus amount of money by specifying a price to be paid in addition to the electronic money when he is inquired by the automatic ticket vending machine 20.

When a surplus amount of money is paid electronically, the automatic ticket vending machine 20 refunds the surplus money when the purchaser pushes down a refund lever after receiving an article. The refund can also be carried out with electronic money through communications, provided that a link remains established between the automatic vending machine 20 and the mobile terminal. Alternatively, the refund may be made upon a request for disconnecting the link from the mobile terminal, or inadvertent disconnection of the link. As the link between the automatic ticket vending machine 20 and the mobile terminal is disconnected, the automatic ticket vending machine 20 turns off illumination for the display and selector 17 or prevents any article from being delivered, and pays out cash from a cash transfer unit 18. The cash transfer unit 18 notifies the center of the numbers of bills and coins stored therein each time it transfers cash.

The present invention can advantageously provide the user with a service in a simple and rapid way, making use of information which certifies a compensation such as an electronic ticket stored in a mobile terminal.

Also, the present invention can conveniently and reliably provide a service contracted through an electronic settlement to the user who should receive the service only among three parties which include an electronic ticket stored in a mobile terminal as a result of the contract, an automatic ticket examiner, and the user.

Further, as the user holds a ticket issued at the time he has entered through an automatic ticket examiner, the user can exit through a general ticket examiner which cannot recognize electronic tickets.

What is claimed is:

1. A ticket examiner for examining a ticket, comprising:
   a ticket slot into which the ticket is entered;
   a pickup port for ejecting the ticket;
   a controller;
   a first antenna covering a long distance service area;
   a second antenna covering a nearby service area; and
   a communication module configured to send a call to a medium of a user, and stop calling to the user medium in response to entry of the ticket into the ticket slot,
   wherein the controller, in response to detection of the user medium by receiving a response to said call at the communication module through the first antenna, receives information of the ticket from the user medium through the first antenna and the communication module, requests authentication of the ticket information to a center apparatus, generates printing data based on the ticket information in response to a result of the reference that the ticket is valid, and stores the printing data in the controller, and
   wherein the controller, in response to detection of the user medium by receiving at the communication module the response to the call through the second antenna, prints the printing data stored on the controller on a slip using a printer to transport the printed slip to the pickup port.

2. A ticket examiner according to claim 1, further comprising:
   a sensor which is different from said first antenna and the second antenna, wherein the communication module starts detection of the user medium through the second antenna in response to an event that the sensor has sensed the user.

3. A ticket examiner according to claim 2, wherein the sensor is an optical sensor.

4. A ticket examiner according to claim 1, further comprising:
   a gate.

5. A ticket examiner according to claim 4, wherein the controller opens the gate after the printer has printed the printing data on the slip.

6. A ticket examiner according to claim 4, further comprising:
   a timer,
   wherein said communication module starts detection of the user medium through the second antenna in response to a lapse of a predetermined period of time by the timer.

7. A ticket examiner according to claim 1, wherein the communication module transmits identification information provided for each medium of the user and a synchronizing clock to the user medium in response to detection of the user medium by the communication module trough the first antenna.

8. A ticket examiner according to claim 7, wherein the communication module requests information of the ticket to the user medium through the second antenna, and in response to the request, receives a result of synchronization by the synchronizing clock and the ticket information from the user medium.

9. A ticket examiner according to claim 1, wherein the controller discards the ticket information from the user medium.

10. A ticket examiner according to claim 9, wherein the controller discards the ticket information from the user medium during a time period starting from a time after the user passes through the ticket examiner and ending at a time when the user medium moves away from a coverage service area of the first antenna.

11. A ticket examiner according to claim 9, wherein the controller requests the user medium to discard the ticket information after the printer has printed the printing data on a slip.

12. A ticket examiner according to claim 1, wherein the user medium is an IC card or a mobile terminal.

13. A ticket examiner according to claim 1, wherein the controller, in response to an event that the communication module establishes a communication with the user medium, transmits a command for reading voice data for aural guidance or voice data stored in the user medium.

14. A ticket examiner according to claim 1, wherein said controller, in response to detection of the user medium by the communication module through the first antenna, receives information of the ticket from the user medium, requests reference of the ticket information to a center apparatus, and generates a magnetic recording data together with the printing data based on the ticket information in response to a result of the authentication that the ticket is valid, and stores the magnetic recording data together with the printing data in the controller, and wherein the controller, in response to detection of the user medium through the second antenna, prints the printing data stored on the controller on a slip using a printer and writes the magnetic recording data stored in the controller onto a slip using a magnetic recorder.

15. A ticket examiner according to claim 1, wherein said first antenna is disposed on an upper surface of the ticket examiner, and wherein said second antenna is disposed on a side surface of the ticket examiner.

16. A ticket examiner according to claim 15, wherein said communication module includes a base-band control module connected to the first antenna and the second antenna.

* * * * *